United States Patent [19]
Dodge

[11] Patent Number: 5,505,416
[45] Date of Patent: Apr. 9, 1996

[54] CLAMP FOR A PIPE OR A TUBE

[76] Inventor: John P. Dodge, 1507 Brixham Ave., McHenry, Ill. 60050

[21] Appl. No.: 261,779

[22] Filed: Jun. 20, 1994

[51] Int. Cl.⁶ .................................................. A47B 96/06
[52] U.S. Cl. .................... 248/230.5; 248/73; 248/218.4; 248/316.6; 403/398
[58] Field of Search ................. 248/72, 73, 74.1, 248/231.6, 316.6, 218.4, 230; 403/398 CR, 399; 52/16, 721, 40

[56] References Cited

U.S. PATENT DOCUMENTS

| | | | |
|---|---|---|---|
| 1,296,060 | 3/1919 | Ferguson . | |
| 1,798,613 | 3/1931 | Manson | 248/230 |
| 1,875,813 | 9/1932 | Kaplan et al. . | |
| 1,997,947 | 4/1935 | Pantek | 68/35 |
| 2,567,463 | 7/1948 | Atkinson | 248/72 |
| 3,289,982 | 12/1966 | Hart, Jr. | 248/41 |
| 3,332,654 | 7/1967 | Jacobson | 248/221 |
| 3,385,545 | 5/1968 | Patton | 248/68 |
| 4,032,096 | 6/1977 | Perrault et al. | 248/73 |
| 4,813,639 | 3/1989 | Midkiff et al. | 248/68.1 |
| 5,039,039 | 8/1991 | Schaffer | 248/59 |
| 5,199,527 | 4/1993 | Jennings | 182/187 |

FOREIGN PATENT DOCUMENTS 12196 of 1906 United Kingdom ................. 248/224.4

*Primary Examiner*—Karen J. Chotkowski
*Assistant Examiner*—Gwendolyn Wrenn
*Attorney, Agent, or Firm*—Mathew R. P. Perrone, Jr.

[57] ABSTRACT

A clamp assembly with a mounting member and a receiving member provides support for various utilities in a building. The receiving member is mounted on a wall or a support pole, especially a support pole used in a building having a flat roof. The mounting member is mounted on a drainpipe for the flat roof, a water pipe, a sprinkler system pipe, an electrical pipe, any processed piping and the like. The receiving member includes at least one slot capable of receiving a rod. The rod is secured to the mounting member.

13 Claims, 4 Drawing Sheets

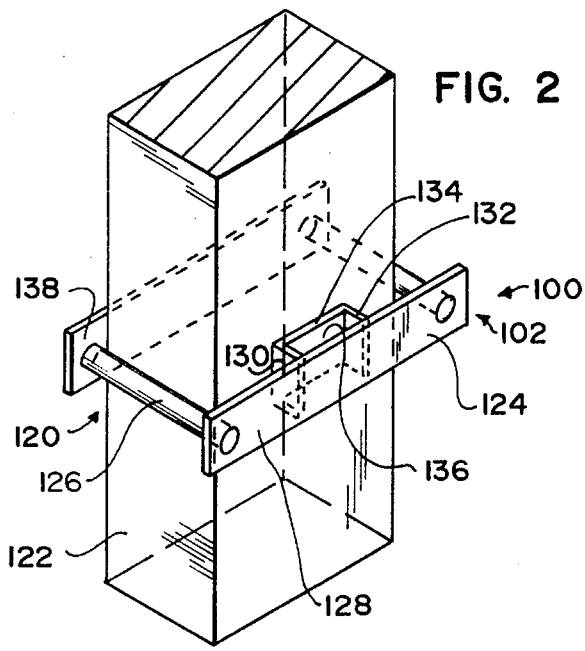
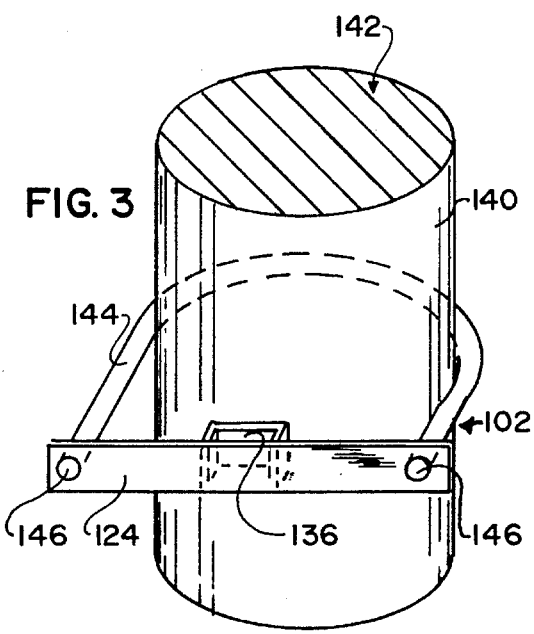
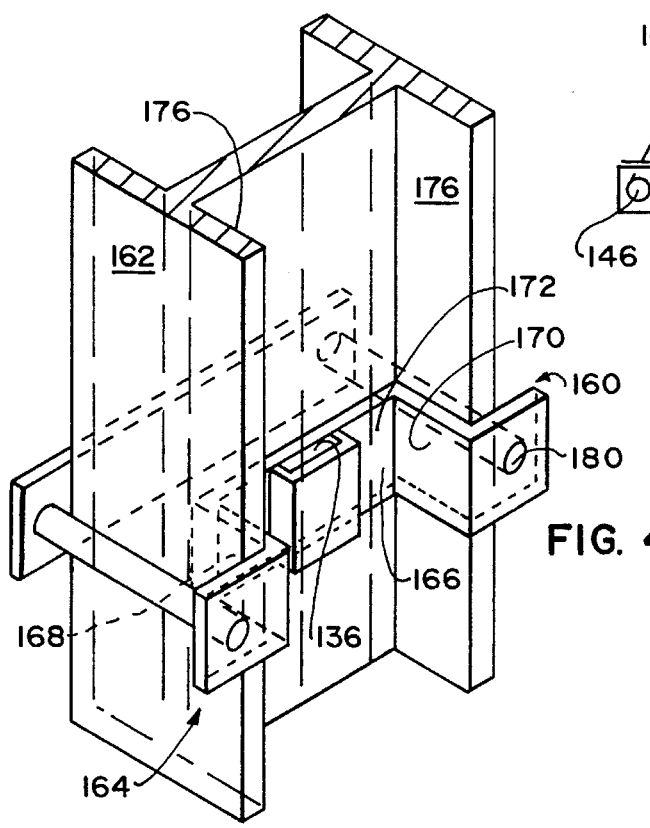

CLAMP FOR A PIPE OR A TUBE

This invention relates to a clamp for a pipe or a tube and more particularly to a clamp for a drainpipe, especially a drainpipe used in a flat roofed building; a water pipe; a sprinkler system pipe; an electrical pipe; any processed piping and the like.

BACKGROUND OF THE INVENTION

In construction, especially of a building having a commercial use, it is common to use a flat roof on that building. Within the flat roofed building there are numerous poles supporting the roof. These poles may be of any suitable shape.

Each support pole for the roof may serve another and additional function. This other function includes providing support for a water pipe; a sprinkler system pipe; an electrical pipe; any other processed piping and the like. Each of these items is important to the function of a building and must be properly supported within the building.

Most importantly, in order to have a flat roof function properly, proper drainage of the roof must occur. To achieve proper drainage, a number of drainpipes must be properly attached to the roof. It is customary to secure each drain pipe for the roof to a pole supporting the roof. At least one clamp assembly is customarily used to secure the drainpipe to the support pole.

The current practice is to formulate the desired clamp assembly for securing the drain pipe or pipe to the support pole right on the job. Formulation of these individual clamps is time consuming. With the increased time consumption, costs increase and unreasonable delays occur in either the original installation of a drainpipe during construction, or replacement of the drain pipes in such a building.

It is desirable to avoid this on site construction of the clamps and have a clamp that can be fastened more efficiently and more quickly at less expense. Yet the variety of support poles lead to a variety of different clamp requirements.

The expense occurs in the job site clamp by having extra material and a worker to form the clamps. If the clamps can be mass produced, and supplied, great advantages occur in material and time usage.

It is difficult to provide one type of clamp for such drainpipes in view of the different shapes of the support poles in a flat roofed building. The support poles can have a cross-section which is either round, I-beam, rectangular or other appropriate shape. It is desired to have a clamp that can support a drainpipe with all these different shapes of support poles.

Currently the mounting of these drainpipes usually requires two, if not three people. This also increase the cost of installing the drainpipes. Yet the drainpipes must be installed in order to achieve the proper drainage for a flat roof.

The problem of securing a drainpipe, especially in a flat roof building, is similar to the problem for securing many different types of pipe. Typical pipes in that class include a water pipe, a sprinkler system pipe, an electrical pipe, any processed piping and the like. By processed piping is meant piping used in gas, air or chemical transportation; or in plants or factories for conveying the same. It clear that the mounting of these pipes is very important. Without proper mounting, the effectiveness of the whole assembly can be adversely affected and the utility of the building greatly diminished. Any device to simplify such mounting offers many advantages.

SUMMARY OF THE INVENTION

Among the many objectives of this invention is the provision of a clamp for a drainpipe used with a flat roofed building, which can be secured to a support for the flat roof.

Another objective of this invention is to provide a clamp, which is mass-produced.

Yet another objective of this invention is to provide a clamp, which is adaptable to a support pole having an I-beam cross-section.

Still another objective of this invention is to provide a clamp, which is adaptable to a support pole having a rectangular cross-section.

Also, an objective of this invention is to provide a clamp, which can be more easily installed.

A further objective of this invention is to provide a clamp, which requires fewer people to install.

A still further objective of this invention is to provide a clamp for a water pipe, which is mass-produced.

Yet a further objective of this invention is to provide a clamp for a sprinkler system pipe, which is mass-produced.

Another objective of this invention is to provide a clamp for an electrical pipe, which is mass-produced.

Yet another objective of this invention is to provide a clamp for a processed pipe, which is mass-produced.

Additionally, an objective of this invention is to provide a clamp for a drainpipe, which is mass-produced.

These and other objectives of the invention (which other objectives become clear by consideration of the specification, claims and drawings as a whole) are met by providing a clamp assembly with a mounting member and a receiving member. The receiving member is mounted on a wall or a support pole, especially a support pole used in a building having a flat roof. The mounting member is mounted on a drainpipe for the flat roof, a water pipe, a sprinkler system pipe, an electrical pipe, any processed piping and the like. The receiving member includes at least one slot capable of receiving a rod. The rod is secured to the mounting member.

BRIEF DESCRIPTION OF DRAWINGS

FIG. 2 depicts a clamp assembly 100 with a rectangular support modification 120 for receiving bracket 102.

FIG. 3 depicts a clamp assembly 100 with a round support modification 140 for receiving bracket 102.

FIG. 4 depicts perspective view of clamp assembly 100 with an I-beam support modification 160 mounted on I-beam 162.

Throughout the figures of the drawings where the same part appears in more than one figure the same number is applied thereto.

DESCRIPTION OF PREFERRED EMBODIMENTS

The clamping assembly of this invention secures a drainpipe to a support pole in a flat roofed building a water pipe, a sprinkler system pipe, an electrical pipe, any processed piping and the like. This clamping assembly includes a receiving bracket capable of fitting around the support pole and a mounting clamp fitting around the drainpipe. The mounting clamp is slidably mounted in the receiving bracket and secures the desired pipe in the proper fashion.

Common to all receiving brackets is a slot member. The slot member is mounted on a first side of the receiving bracket. The slot member includes two risers and a bar member forming a hollow, rectangularly shaped device. This slot member with the device is clamped to the support pole by means of threaded members and a base support member. The threaded members join the receiving bracket to the support pole by joining the base support member therearound.

The base member and the receiving bracket are shaped according to type of support pole being used. If the support pole is round, the support member appears to be annular and capable of fitting therearound. If the support pole is rectangular, the base support member is also constructed similarly, and usually flat. If the support pole has an I-beam cross-section, the base support member and the receiving bracket are also constructed similarly.

The drainpipe clamp includes two members capable of being bolted around the drainpipe the first member supports the drainpipe, the bolts secure the mounting member to the support member with the drainpipe in the middle. On the support member is a flat rod capable of being received by the receiving slot. With the adjustment factors formed by the threaded members of each clamp the receiving bracket and the mounting clamp, the adjustment and mounting of the drainpipe can be much more easily accomplished.

A receiving bracket may also be a plural receiver. The plural receiver has more than one slot. It may thus support more than one clamp. Plural receiver may be secured to a wall or around a support pole if desired. The wall mount is preferred because appropriate slot space is limited around the support pole.

Figure 1:
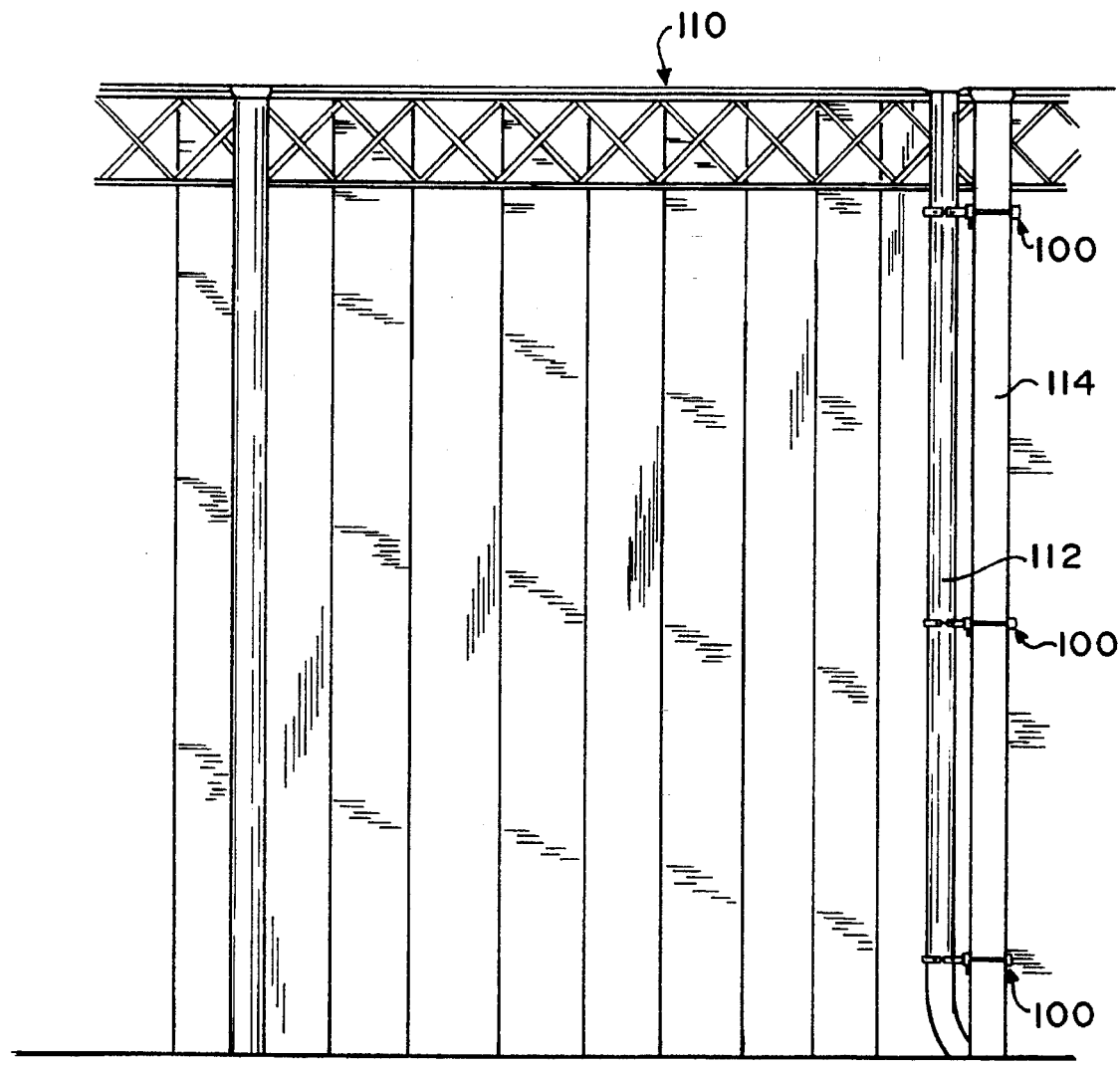
FIG. 1 depicts a side view of clamp assembly 100 on the interior of a flat roof building 110.

Referring now to FIG. 1, clamp assembly 100 is used on the interior of a flat roof building 110. The clamping assembly 100 attaches a drainpipe 112 to a support pole 114 in flat roofed building 110. This clamping assembly 100 includes a receiving bracket 102 capable of fitting around the support pole 114 and a mounting clamp 104 capable of fitting around the drainpipe 112. The mounting clamp 104 is slidably mounted in the receiving bracket 102, but is secured to the drainpipe 112. As the receiving bracket 102 is secured to the support pole 114, drainpipe 112 is secured in the proper position.

In FIG. 2, clamp assembly 100 has a receiving bracket 102 with rectangular support modification 120, which in turn assumes support pole 114 has a rectangular cross-section 122. This receiving bracket 102 includes a flat slot member 124. The slotted member 124 forms a first side of the receiving bracket 102. The slotted member 124 includes a flat base bar 128 with a first riser 130 spaced apart from a second riser 132 protruding therefrom.

A bar member 134 connects first riser 130 and second riser 132 to complete slot 136. The flat base bar 128 combines with bar member 134, first riser 130 and second riser 132 to form a hollow, rectangularly shaped slot 136 on slotted member 124. Welding or another suitable process secures flat base bar 128, bar member 134, first riser 130 and second riser 172 in their respective positions.

Bar member 134, first riser 130 and second riser 132 are common to all clamp assemblies 100. It follows that hollow, rectangularly shaped slot 136 is also common to all clamp assemblies 100. In this Figure, slot 136 is adjacent to the support pole 114 with rectangular cross-section 122.

This version of receiving bracket 102 has slotted member 124 clamped to the support pole 114 of the rectangular cross-section 122 by means of threaded members 126 connecting a base support member 138 at the ends thereof. Base support member 138 is connected to flat slot member 124 with support pole 114 therebetween. The threaded members 126 join the receiving bracket 102 to the support pole 114 by securing the base support member 138 therearound with the slotted member 124.

Threaded members 126 may be a nut and bolt assembly or other joining mechanism. For example, the joining mechanism may have threads as a part of the bracket or another suitable configuration.

Similarly to FIG. 2, FIG. 3 has a clamp assembly 100 with a rounded support modification 140. Of course this factor assumes support pole 114 has a rounded cross-section 142. This receiving bracket 102 includes a flat slot member 124 similar to rectangular support modification 120.

This version of receiving bracket 102 has slot member 124 clamped to the support pole 114 of the rounded cross-section 142 of by means of a U-bolt 144. Nuts 146 secure flat slot member 124 to U-bolt 144 with support pole 114 therebetween.

Figure 5:
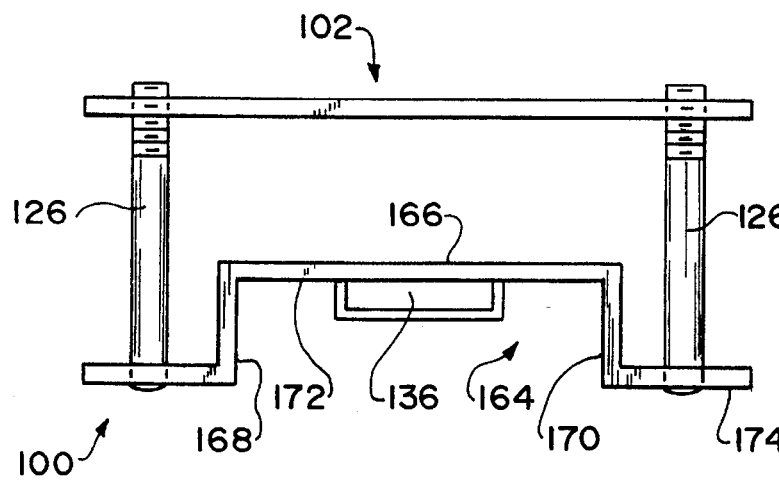
FIG. 5 depicts a top plan view of clamp assembly 100 with a I-beam support modification 160 for receiving bracket 102.

With FIG. 4 and FIG. 5, it is clear that clamp assembly 100 includes an I-beam support modification 160, so that clamp assembly 100 can be mounted on I-beam 162 or other rectangular support. This receiving bracket 102 includes an angled slotted member 164. The angled slotted member 164 forms a first side of the receiving bracket 102 for I-beam modification 160.

The angled slotted member 164 includes slot 136 formed as in FIG. 2. However, slot 136 is not adjacent to I-beam 162, although such a structure is possible.

The angled slotted member 164 has an interior piece 166, which has slot 136 mounted thereon. At a first end of interior piece 166, is a first end bar 168. At a second end of interior piece 166, is a second end bar 170. First end bar 168 is substantially parallel to second end bar 170.

First end bar 168 has a first attaching bar 172 secured at the end oppositely disposed from interior piece 166. Likewise, second end bar 170 has a second attaching bar 174 secured at the end oppositely disposed from interior piece 166. First attaching bar 172 and second attaching bar 174 are substantially coplanar and extend outwardly on the angled, slotted member 164.

Angled, slotted member 164 may be formed in any suitable manner. Typical forming methods include bending, welding or another suitable method. Interior piece 166 fits in the I-beam 162. First end bar 168 and second end bar 170 are parallel to the sides 176 of the I-beam 162. First attaching bar 172 and second attaching bar 174 extend beyond the I-beam 162 and provide mounting apertures 180 for threaded members 126 to secure angled slotted member 164 to base member 128, for example.

Figure 6:
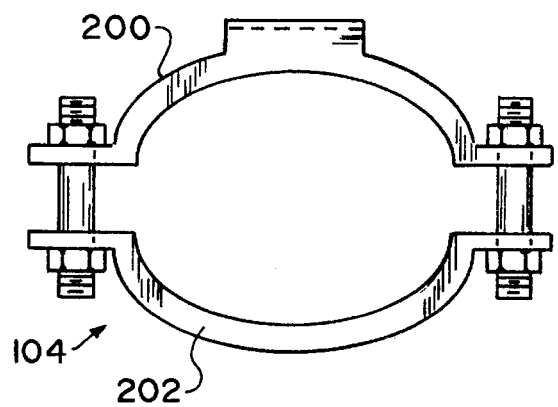
FIG. 6 depicts a top plan view of mounting member 104.
Figure 7:
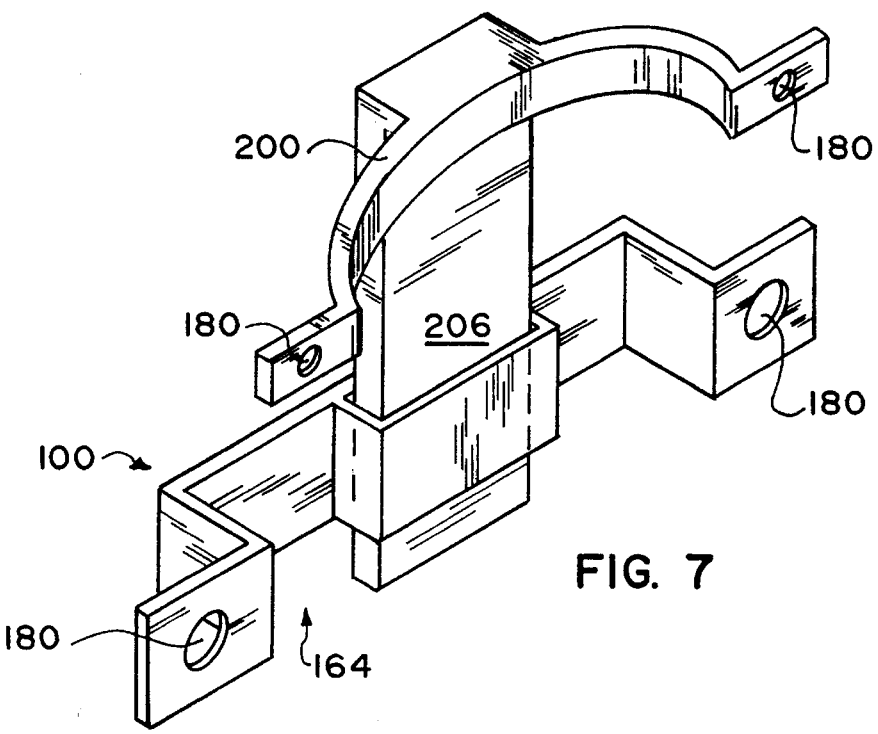
FIG. 7 depicts a partial perspective view of clamp assembly 100 showing receiving bracket 102 and mounting member 104.

Adding FIG. 6 and FIG. 7 to the consideration depicts the cooperation necessary to form clamp assembly 100 from receiving bracket 102 and mounting member 104. Front clamp 200 of mounting member 102 includes a rod 206 secured substantially tangential position relative to front clamp 200, and substantially perpendicular to the plane formed by front clamp 200 and rear clamp 202.

Since drain pipe 112 or other pipe is substantially rounded, front clamp 200 and rear clamp 202 wrap therearound due to their generally arcuate shape. Rod 206 is received in slot 136. With the securing of receiving bracket 102 and mounting member 104 in their respective positions, drainpipe 112 is secured to support pole 114.

Figure 8:
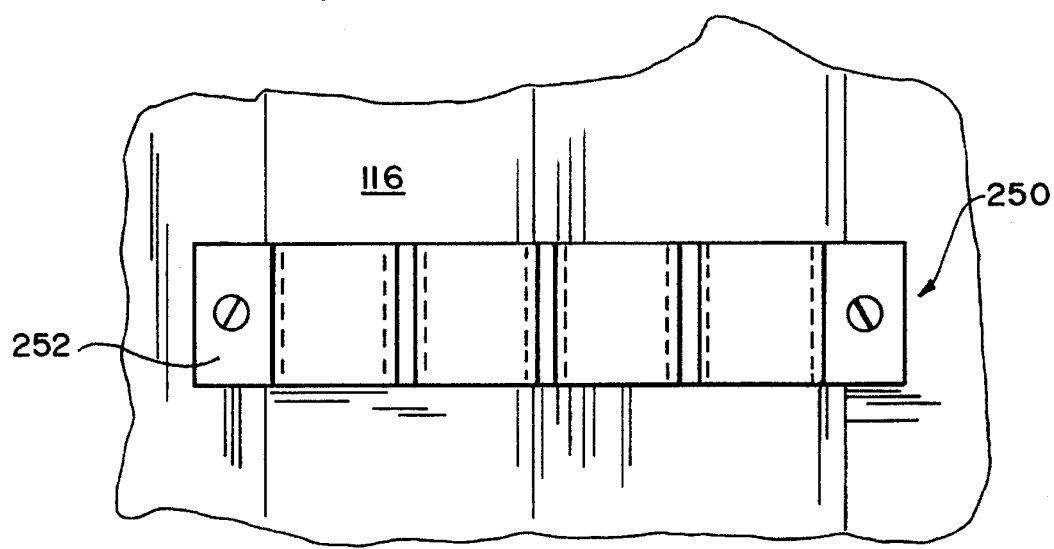
FIG. 8 depicts a perspective view of plural receiver 250 mounted on support pole 114.

In FIG. 8, the plural receiver 250 can be mounted to a support pole 114 of any suitable type such as rectangular cross-section 122, shown in FIG. 2. In this fashion, the appropriate mounting member such as mounting clamp 104 can be mounted in the slot 136 as desired. The mounting member may contain and support pipes of various sorts. In any suitable fashion, the desired results can be obtained.

Figure 9:
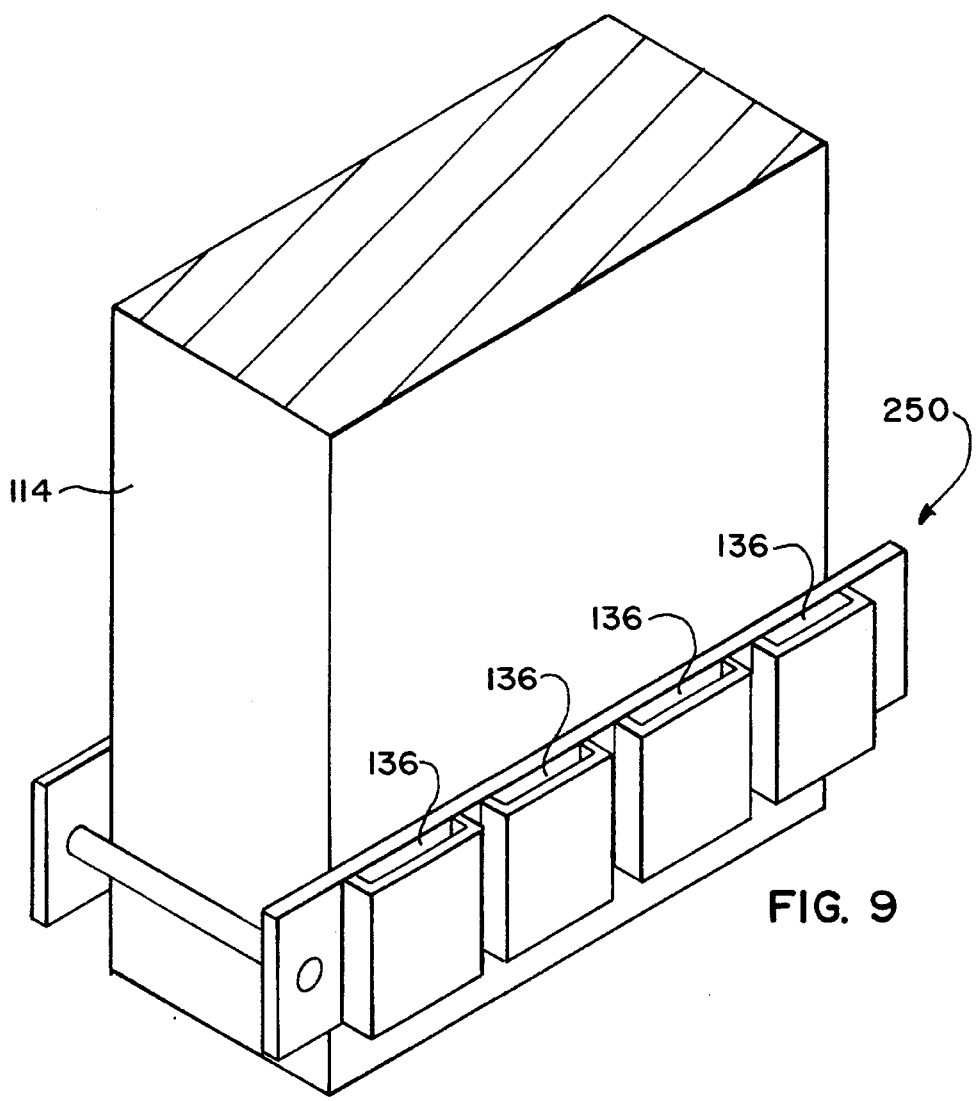
FIG. 9 depicts a side view of plural receiver 250 mounted on wall 116 of flat roofed building 110.

Receiving bracket 102 may also be modified to plural receiver 250 as shown in FIG. 9, for a wall 116. FIG. 9 depicts receiving plural receiver 250 with a plurality of receiving slots 136 thereon suitable for mounting on wall 116 of building 110. These slots 136 are similar in structure to the slot 136. However, there are more of them on the base multiple base 252. More specifically, the multiple base 252 includes a plurality of slots 136 structured in the same fashion as any of the single slot members 124 disclosed herein to form plural receiver 250.

This application—taken as a whole with the specification, claims, abstract, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this method and apparatus can become clear to a person having ordinary skill in this particular art. Such modifications are clearly covered by this disclosure.

What is claimed and sought to be protected by Letters Patent of the United States is:

1. In combination with a building having a flat roof, at least one support pole for the building, at least one wall, the building including a pipe and a clamp to support the pipe on the support pole, the clamp including a plurality of mounting members and a receiving bracket, comprising:
    a) the receiving bracket being mounted on the wall of the building;
    b) the mounting members being secured to the pipe adjacent to the wall of the building;
    c) a means joining the receiving bracket to at least two of the mounting members to thereby hold the pipe adjacent to the wall;
    d) the receiving bracket including a plurality of slot members mounted thereon;
    e) the slot members including a first riser and a second riser;
    f) the first riser and the second riser being spaced apart and secured at a first end to a base bar of the receiving bracket; and
    g) bar members connecting each of a second end of the first risers and the second risers to thereby form a plurality of slots.

2. The clamp of claim 1, further comprising:
    a) the mounting member including a rod member and a mounting support;
    b) the rod member and the mounting support including a mounting member joining means for a connection therebetween;
    c) the rod member including a rod base with a rod support secured thereon; and
    d) the rod support being received by the slot.

3. The clamp of claim 2, further comprising the mounting member joining means being at least one nut and bolt assembly.

4. The clamp of claim 1, further comprising the receiving member being adaptable to an I-beam cross-section.

5. The clamp of claim 1, further comprising the receiving member being adaptable to a rectangular cross-section.

6. The clamp of claim 1, further comprising the receiving member being adaptable to a round cross-section.

7. The clamp of claim 1, further comprising:
    a) the mounting member including a rod member and a mounting support;
    b) the rod member and the mounting support including a mounting member joining means for a connection therebetween;
    c) the rod member including a rod base with a rod support secured thereon; and
    d) the rod support being received by the slot.

8. The clamp of claim 7, further comprising the pipe being at least one selected from the group consisting of a drainpipe, a water pipe, a sprinkler system pipe, and an electrical pipe.

9. In combination with a building having a flat roof, at least one support pole for the building, a clamp for use in combination with the support pole, the improvement comprising the clamp including a mounting member and a receiving bracket, the clamp further comprising:
    a) the receiving bracket being fitted to the support pole of a flat roof;
    b) the mounting member being secured to the pipe adjacent to the support pole;
    c) a means joining the mounting member and the receiving bracket to thereby hold the pipe adjacent to the support pole;
    d) the mounting member joining means including at least one nut and bolt assembly;
    e) the receiving bracket including a base support member and a flat base bar;
    f) the flat base bar including a slot member mounted thereon;
    g) the slot member including a first riser and a second riser;
    h) the first riser and the second riser being spaced apart and secured at a first end to the flat base bar; and
    i) a bar member connecting a second end of the first riser and the second riser to thereby form the slot.

10. The clamp of claim 9, further comprising:
    a) the mounting member including a rod member and a mounting support;
    b) the rod member and the mounting support including a mounting member joining means for a connection therebetween;

c) the rod member including a rod base with a rod support secured thereon; and d) the rod support being received by the slot.

11. A clamp for use in combination with a pipe within a building, in order to mount the pipe in the building, the clamp including a mounting member and a receiving bracket, comprising:

a) the receiving bracket being adapted to receive the mounting member;

b) the mounting member being adapted to secure a pipe on the receiving bracket;

c) a means for joining the mounting member and the receiving bracket to thereby hold the pipe adjacent to the receiving bracket;

d) the receiving bracket including means for receiving at least two of the mounting members;

e) the receiving means including a flat base bar; and f) the flat base bar including a plurality of laterally spaced slot members mounted thereon;

g) each of the slot members include a first riser and a second riser;

h) the first riser and the second riser being spaced apart and secured at a first end to the flat base bar; and i) a bar member connecting a second end of the first riser and the second riser to thereby form the slot.

12. The clamp of claim 11, further comprising:

a) the slot member including a first riser and a second riser;

b) the first riser and the second riser being spaced apart and secured at a first end to the receiving base; and c) a bar member connecting a second end of the first riser and the second riser to thereby form a slot.

13. The clamp of claim 12, further comprising:

a) the mounting member including a rod member and a mounting support;

b) the rod member and the mounting support including a mounting member joining means for a connection therebetween;

c) the rod member including a rod base with a rod support secured thereon; and d) the rod support being received by the slot.

* * * * *